United States Patent [19]

Matsuhashi et al.

[11] Patent Number: 4,602,205
[45] Date of Patent: Jul. 22, 1986

[54] BATTERY VOLTAGE REGULATING SYSTEM

[75] Inventors: Hajime Matsuhashi; Toshinori Maruyama, both of Kariya; Koshi Torii, Iwakura, all of Japan

[73] Assignee: Nippondenso Co., Ltd., Kariya, Japan

[21] Appl. No.: 677,022

[22] Filed: Nov. 30, 1984

[30] Foreign Application Priority Data

Dec. 5, 1983 [JP] Japan .................... 58-229592

[51] Int. Cl.[4] ............................................. H02J 7/00
[52] U.S. Cl. ........................................ 320/64; 320/1; 320/32; 320/39; 323/216
[58] Field of Search ............... 320/1, 13, 31, 32, 39, 320/64; 323/312, 315, 316

[56] References Cited

U.S. PATENT DOCUMENTS 4,233,556 11/1980 Nagel et al. ............................ 322/28
4,477,766 10/1984 Akita et al. ............................ 320/64

Primary Examiner—Patrick R. Salce
Assistant Examiner—Anita M. Ault
Attorney, Agent, or Firm—Cushman, Darby & Cushman

[57] ABSTRACT

A battery voltage regulating system for an automotive vehicle, wherein a first and a second comparators for sensing a battery voltage and a delay circuit connected to the comparators and controlling a power transistor connected in series with a field coil of an alternator with a certain delay time. The delay circuit includes a capacitor and a charge-discharge current changing circuit so that when the battery voltage exceeds a reference voltage of the second comparator, which is higher than that of the first comparator, a charge on the capacitor is discharged with a larger discharging current than the normal discharging current, to thereby shorten the delay time.

4 Claims, 3 Drawing Figures

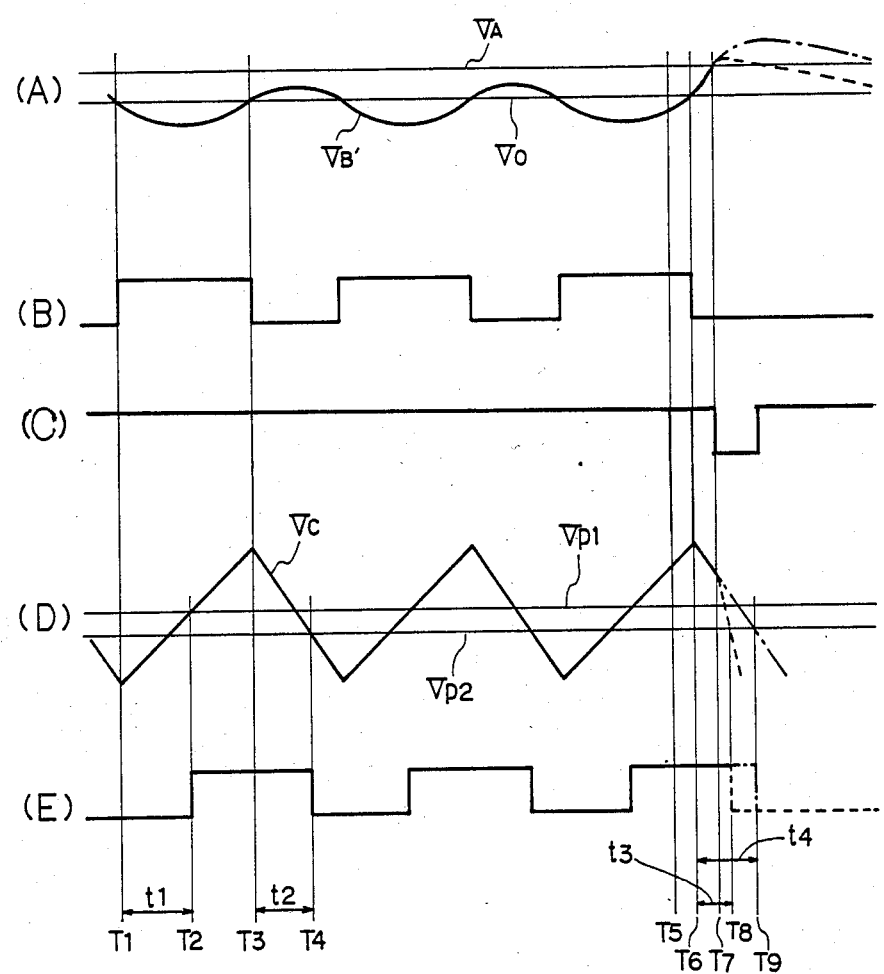

BATTERY VOLTAGE REGULATING SYSTEM

BACKGROUND OF INVENTION

1. Field of Invention

The present invention relates to a battery voltage regulating system for controlling an output voltage of an alternating current generator driven by an internal combustion engine and/or a charging voltage for a battery mounted on a motor vehicle.

2. Brief Description of Prior Arts

Various types of voltage regulating systems are known in the art, wherein either a battery voltage or an alternator output voltage is sensed and a field current flowing through a field coil of an alternator is cut off when the sensed voltage exceeds a predetermined value, to thereby maintain the battery voltage at a constant desired value.

The feedback voltage (battery voltage or alternator output voltage) includes generally a relatively large amount of ripple component and a noise component caused by a switching operation of the field current is also included in the feedback voltage. In a conventional voltage regulating system, a delay means is provided to remove an undesirable influence by the above ripple component and/or noise component, a delay time of which is usually some ten microseconds or some hundred microseconds.

In such a system, when a use of an electric load having a large capacity is stopped, a battery voltage is temporarily rapidly increased due to a rapid decrease of consuming current. The feedback voltage is thereby increased to drive a power transistor into a non-conductive state. However, since the delay means is provided in the conventional regulating system, some seconds are required until the power transistor is driven into the non-conductive state, with a result that an excess current flows through the power transistor during that time period causing a breakage of the power transistor.

SUMMARY OF INVENTION

It is, therefore, an object of the present invention to overcome the above drawback and to provide an improved voltage regulating system, which comprises a delay means and a charge-discharge changing means for shortening a delay time when a feedback voltage rapidly increases.

The present invention provides a battery voltage regulating system for an automotive vehicle having a battery, an alternator driven by an internal combustion engine mounted on said vehicle and generating an alternating current, a full-wave rectifier for rectifying said alternating current to charge said battery and an electrical load connected to said battery, comprising;

first sensing means connected to said battery for sensing whether a battery voltage exceeds a first reference voltage and for producing a first sensing signal;

second sensing means also connected to said battery for sensing whether said battery voltage exceeds a second reference voltage and for producing a second sensing signal, said second reference voltage being higher than said first reference voltage;

delay means connected to said first and second sensing means and producing a control signal in response to said first and second sensing signals; and a power transistor connected to a field coil of said alternator and controlling a field current flowing through said field coil in response to said control signal, wherein said delay means comprises:

a capacitor; and a charge-discharge current changing circuit connected to said first and second sensing means for supplying a charging or discharging current to said capacitor in response to said first sensing signal and for supplying one of changing and discharging currents to said capacitor when said second sensing signal is applied to said charge-discharge current changing circuit, said one of charging and discharging currents determined by second sensing signal is larger than corresponding charging or discharging current determined by said first sensing signal so that a delay time determined by said second sensing signal is shorter than that determined by said first sensing signal.

BRIEF DESCRIPTION OF DRAWINGS

FIG. 3 is a waveform diagram for explaining an operation of the embodiment shown in FIG. 1.

DETAILED DESCRIPTION OF PREFERRED EMBODIMENT

The present invention will be explained with reference to the attached drawings.

Figure 1:
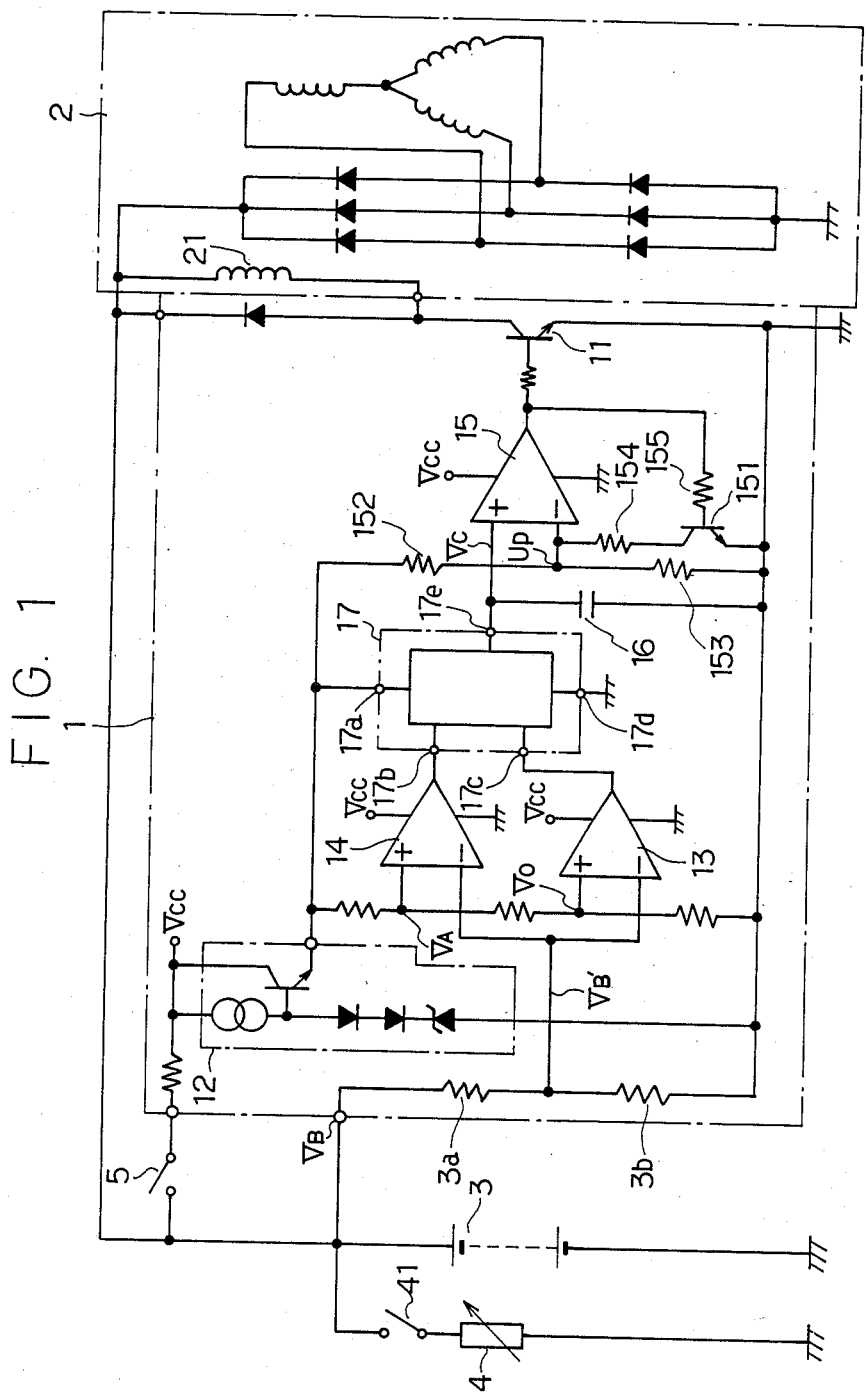
FIG. 1 is an electric wiring diagram showing a voltage regulating system according to an embodiment of the present invention.

In FIG. 1, numeral 1 designates a voltage regulating system (hereinafter referred to as a voltage regulator), numeral 2 designates an alternating current generator (alternator) driven by an internal combustion engine for generating alternating current, the alternator including a full-wave rectifier for rectifying the alternating current, numeral 3 designates a battery mounted on a motor vehicle, numeral 4 designates various kinds of electrical loads such as head lamps and so on, and numeral 5 designates an ignition key switch.

The voltage regulator 1 includes a power transistor 11 for controlling a current flow of a field current flowing through a field coil 21 of the alternator 2, a constant voltage circuit 12, comparators 13, 14, 15, a capacitor 16 and a charge-discharge current changing circuit 17, wherein the comparator 15, the capacitor 16 and the circuit 17 constitute a delay circuit.

A feedback voltage $V_{B'}$ responding to a battery voltage $V_{B'}$ divided by a pair of resistors 3a and 3b, is inputted to inverting input terminals of the comparators 13 and 14, respectively. Inputted to non-inverting input terminals of the comparators 13 and 14 are first and second reference voltages $V_O$ and $V_A$ supplied from the constant voltage circuit 12, wherein the second reference voltage $V_A$ is larger than the first reference voltage $V_O$.

A third reference voltage $U_p$ is also applied to an inverting input terminal of the comparator 15 from the circuit 12 by means of a pair of divided resistors 152 and 153. A series connection of a resistor 154 and a collector-emitter path of a transistor 151 is connected across the resistor 153, a base of the transistor 151 is connected to an output terminal of the comparator 15 through a resistor 155, so that a hysterisis function is given to the comparator 15. An output terminal 17e of the charge-discharge current changing circuit 17 is connected to the capacitor 16 and a non-inventing input terminal of the comparator 15.

A pair of input terminals 17b and 17c of the circuit 17 are, respectively, connected to output terminals of the comparators 14 and 13, a terminal 17a is connected to the constant voltage circuit 12 and a terminal 17d is grounded.

Figure 2:
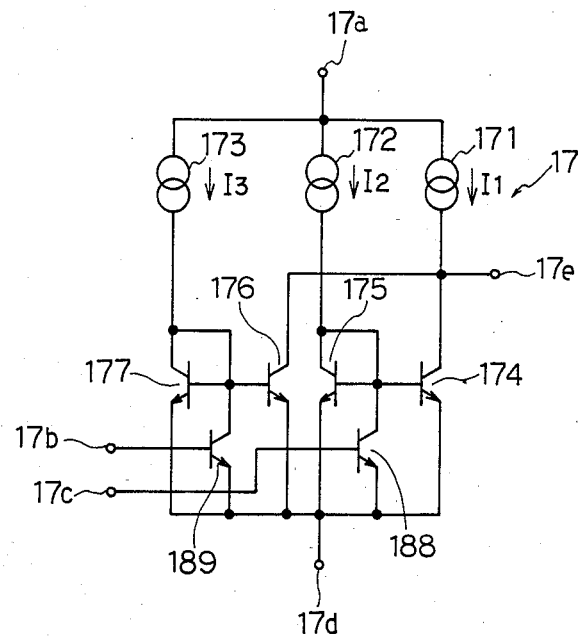
FIG. 2 is an electric wiring diagram showing a detailed construction of a charge-discharge current changing circuit in FIG. 1.

The detailed construction will be explained with reference to FIG. 2, wherein numerals 171, 172 and 173 designate constant current sources for supplying constant currents $I_1$, $I_2$ and $I_3$, respectively, and as understood from the following description, the current source 171 acts as a charging current source, while the current sources 172 and 173 act as discharging current sources. Current values are so designed that the current $I_2$ is greater than the current $I_1$. Numerals 174, 175, 176 and 177 designate transistors for forming current-mirror circuits, respectively, and numerals 188 and 189 designate also transistors for controlling operations of the current-mirror circuits. Namely, when both of the transistors 188 and 189 are in conductive states, a current $I_1$ flows out of the output terminal 17e to the capacitor 16 for charging it, when the transistor 188 becomes non-conductive state and the transistor 189 is in the conductive state, a current $I_2-I_1$ flows from the capacitor 16 to the terminal 17e for discharging it, and when the both transistors become non-conductive, a current $I_3+I_2-I_1$ flows from the capacitor 16 to the terminal 17e for discharging it.

An operation of the voltage regulator shown in FIGS. 1 and 2 will be explained with reference to waveform diagrams shown in FIG. 3.

When a battery voltage $V_B$ is decreased, the feedback voltage $V_{B'}$ is correspondingly decreased. At a time $T_1$, at which the feedback voltage $V_{B'}$ becomes lower than the first reference voltage $V_O$ (See (A) of FIG. 3), the output voltage of the comparator 13 is changed from a low level to a high level as shown in (B) of FIG. 3. Since the comparator 14 is producing a high level signal, both of the transistors 188 and 189 become conductive states so that the charging current $I_1$ flows from the circuit 17 to the capacitor 16 for charging it as shown in (D) of FIG. 3. When a voltage $V_C$ across the capacitor 16 exceeds a reference voltage $V_{P1}$ at a time $T_2$ (See (D) of FIG. 3), the comparator 15 produces a high level signal, as shown in (E) of FIG. 3, to drive the power transistor 11 into a conductive state, so that the field current flows through the field coil 21 and the battery voltage is again increased.

At a time $T_3$, at which the feedback voltage $V_{B'}$ becomes higher than the first reference voltage Vo (See (A) of FIG. 3), the output voltage of the comparator 13 is changed from the high level to the low level (See (B) of FIG. 3). Then the transistor 188 becomes non-conductive, so that the discharging current $I_2-I_1$ flows from the capacitor 16 to the terminal 17e for discharging as shown in (D) of FIG. 3. When the voltage Vc across the capacitor 16 becomes lower than a reference voltage Vp2 at a time $T_4$, the comparator 15 produces a low level signal, as shown in (E) of FIG. 3, to drive the power transistor 11 into a non-conductive state, so that the field current is cut off.

By repeating the above operation, the battery voltage $V_B$ is controlled at a desired value. And as understood from the above operation, the power transistor 11 is driven into the conductive or non-conductive state with a delay time $t_1$ or $t_2$, and a difference between Vp1 and Vp2 of the reference value is a hysterisis effect caused by the transistor 151.

When the switch 41 is opened at a time $T_5$ to disconnect the load 4 having a large capacity from the battery 3, a battery charging voltage rapidly increases, as shown in (A) of FIG. 3. At a time $T_6$, at which the feedback voltage $V_{B'}$ becomes higher than the first reference voltage $V_O$ and the charge on the capacitor 16 is discharged with the discharging current $I_2-I_1$, as in the same manner at the time $T_3$. Since the battery voltage rapidly increases and at a time $T_7$ the feedback voltage $V_{B'}$ exceeds the second reference voltage $V_A$ as shown in (A) of FIG. 3, the comparator 14 produces a low level signal as shown in (C) of FIG. 3 and both of the transistors 188 and 189 become non-conductive, so that the charge on the capacitor 16 is discharged with the discharging current $I_3+I_2-I_1$ (which is larger than the discharing current $I_2-I_1$) from the time $T_7$ as indicated by a dotted line in (D) of FIG. 3. The voltage across the capacitor 16 becomes lower than the reference voltage $V_{p2}$ at a time $T_8$ and the power transistor 11 is made non-conductive to cut off the field current.

If the discharging current was not changed from $I_2-I_1$ to $I_3+I_2-I_1$, the power transistor 11 would be made non-conductive at a time $T_9$ as shown in (D) and (E) of FIG. 3. As apparent from the above operation, a delay time $t_3$ is shorter than a delay time $t_4$ in case of no change of the discharging current, whereby the breakage of the power transistor can be prevented.

As understood from the above-explained embodiment, the power transistor is driven into the non-conductive state with a shorter delay time when the battery voltage rapidly increases.

What is claimed is:

1. A battery voltage regulating system for an automotive vehicle having a battery, an alternator driven by an internal combustion engine mounted on said vehicle and generating an alternating current, a full-wave rectifier for rectifying said alternating current to charge said battery and an electrical load connected to said battery, comprising;

first sensing means connected to said battery for sensing whether a battery voltage exceeds a first reference voltage and for producing a first sensing signal;

second sensing means also connected to said battery for sensing whether said battery voltage exceeds a second reference voltage and for producing a second sensing signal, said second reference voltage being higher than said first reference voltage;

delay means connected to said first and second sensing means and producing a control signal in response to said first and second sensing signals; and a power transistor connected to a field coil of said alternator and controlling a field current flowing through said field coil in response to said control signal, wherein said delay means comprises:

a capacitor; and a charge-discharge current changing circuit connected to said first and second sensing means for supplying a charging or discharging current to said capacitor in response to said first sensing signal and for supplying one of charging and discharging currents to said capacitor when said second sensing signal is applied to said charge-discharge current changing circuit, said one of charging and discharging currents determined by said second sensing signal is larger than a corresponding charging or discharging current determined by said first sensing signal so that a delay time determined by said second sensing signal is shorter than that determined by said first sensing signal.

2. A battery voltage regulating system as set forth in claim 1, wherein said delay means comprises a comparator connected at its output terminal to said power transistor, a third reference voltage being inputted to one input terminal of said comparator and a voltage across said capacitor being inputted to another input terminal for comparing said voltage across said capacitor with said third reference voltage.

3. A battery voltage regulating system as set forth in claim 2, wherein said delay means comprises a feedback circuit connected between said output terminal of said comparator and said one input terminal of said comparator so that said comparator performs a hysterisis function.

4. A battery voltage regulating system as set forth in claim 1, wherein said charge-discharge current changing circuit comprises:

a pair of current-mirror circuits, each having first and second transistors connected at their bases to each other;

a pair of switching transistors connected at their bases to said first and second sensing means, respectively, and at their collectors to said bases of said first and second transistors of said pair of current-mirror circuits, respectively;

a first constant current source connected to both collectors of said first transistors of said pair of current-mirror circuits for supplying thereto a first constant current $I_1$, said collectors being connected to said capacitor;

a second constant current source connected to a collector of said second transistor of one of said pair of current-mirror circuits for supplying thereto a second constant current $I_2$, the current $I_2$ being larger than the current $I_1$; and a third constant current source connected to a collector of said second transistor of the other current-mirror circuit for supplying thereto a third constant current $I_3$.

* * * * *